C. J. KALKHURST.
TRIP MECHANISM FOR CULTIVATORS.
APPLICATION FILED FEB. 11, 1907.
903,867.
Patented Nov. 17, 1908.
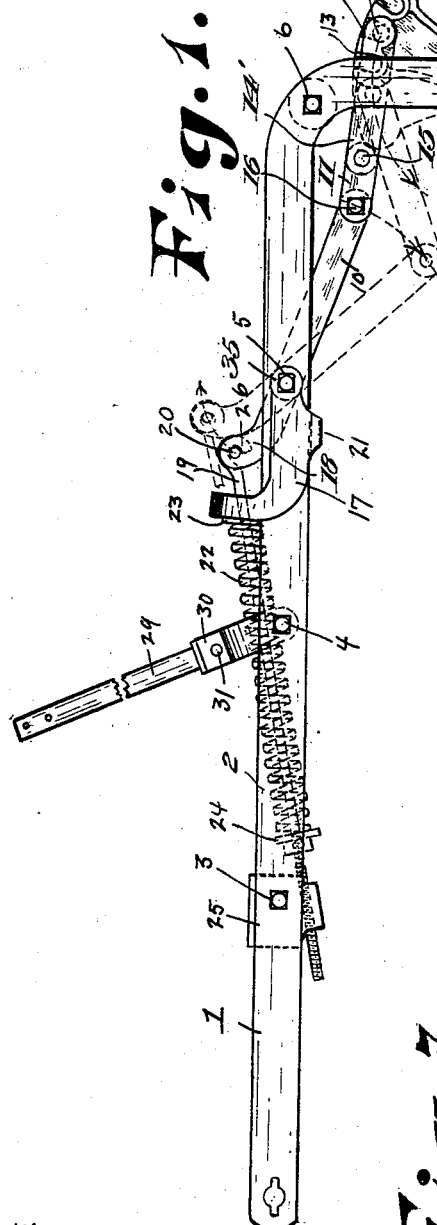
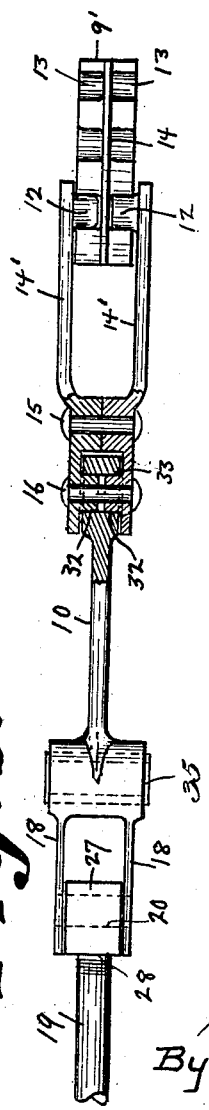
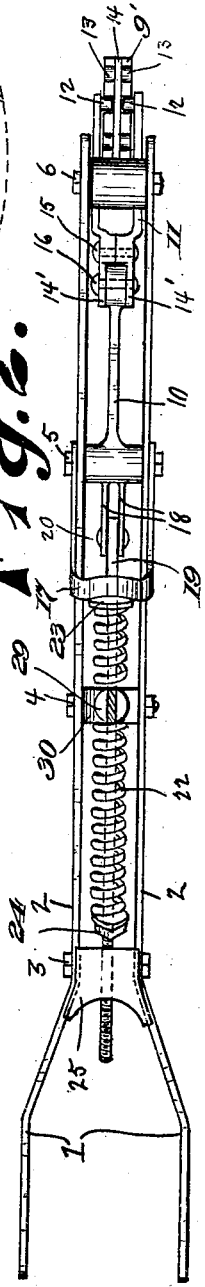
WITNESSES:
INVENTOR
Charles J. Kalkhurst
By Erwin & Wheeler
ATTORNEYS.

UNITED STATES PATENT OFFICE.

CHARLES J. KALKHURST, OF BEAVER DAM, WISCONSIN.

TRIP MECHANISM FOR CULTIVATORS.

No. 903,867.  Specification of Letters Patent.  Patented Nov. 17, 1908.

Application filed February 11, 1907. Serial No. 356,692.

*To all whom it may concern:*

Be it known that I, CHARLES J. KALKHURST, a citizen of the United States, residing at Beaver Dam, county of Dodge, and State of Wisconsin, have invented new and useful Improvements in Trip Mechanism for Cultivators, of which the following is a specification.

My invention relates to improvements in that class of spring actuated trip mechanism for cultivators by which the tooth supporting shank of the cultivator is retained rigidly in its normal position for all ordinary work but which is adapted when brought in contact with an obstruction and a certain predetermined resistance to yield and permit the tooth to be inclined rearwardly until it has passed over such obstruction when the shank will be automatically brought forward to its normal position for use.

My improvement pertains more especially, first, to the peculiar construction and relative arrangement of the tooth supporting shank, the toggle joint levers and the actuating spring, whereby the spring acts with the least power upon the levers when the tooth is in its normal position, and whereby as the tooth is thrown back by contact with an obstruction the spring will act with gradually increasing leverage and will exert its greatest power upon the toggle joint levers and shank as the shank and tooth supported thereon approach the extreme limit of their rearward movement when they will be restored to their normal position as soon as out of contact with the obstruction.

My invention pertains second to the peculiar construction of the lower member of the toggle joint levers and the means for connecting it with the upper member of the toggle joint levers and with the tooth supporting shank. Third, to the means of supporting the upper member of the toggle joint levers from the draw bars or beam; and fourth, to the means of supporting the actuating spring by which the tooth is normally retained in its normal position.

My invention is further explained by reference to the accompanying drawings in which, Figure 1 is a side view of my improvement as applied to one of the beams of the cultivator. It will of course be understood that the cultivator is of ordinary construction and provided with a plurality of beams and cultivator teeth. Fig. 2 is a top view of the device shown in Fig. 1. Fig. 3 is a top view part in section of the toggle joint levers in connection with the upper end of the tooth supporting shank.

Like parts are identified by the same reference characters throughout the several views.

1 represents a preferred form of beam with which my improved spring actuated trip mechanism is connected. The beam 1 comprises two draw bars 2, 2, which are connected together by the transversely arranged bolts 3, 4, 5, 6 and 7. 8 represents the cultivator tooth and 9 the tooth supporting shank. The shank 9 is pivotally supported from the lower end of the beam between the bars 2, 2, by the pivotal bolt 7. Said shank is retained near its normal vertical position shown in Fig. 1 by the toggle joint levers 10 and 11 and the lever actuating spring. The said levers are connected at one end between the draw bars 2 of the beam by the pivotal bolt 5 and at their opposite end with the upper end 9' of the shank by the two opposing trunnions 12, 12 which trunnions are adapted to engage in two opposing recesses 13 upon the respective sides of the central flange 14 of the shank. To provide for adjusting the shank and the cultivator tooth at different angles to the vertical, I preferably provide the upper end of the same with two series of recesses 13, one series located upon one side of said central flange 14 and the other upon the opposite side. Thus it will be obvious that when desirous to incline the tooth rearwardly so as to run more lightly over the soil to be cultivated the trunnions 12 are adjusted in the two rear opposing recesses 13 of the shank, and when desirous to incline the tooth forwardly, the trunnions 12 are adjusted in the forward recess 13 of such shank, and when desirous to adjust the tooth at an intermediate point, said trunnions are adjusted in the central recess or notch 13. Thus it is obvious that by this arrangement the inclination of the tooth may be readily and quickly adjusted at any desired angle to the beam corresponding with the distances between the notches or recesses 13 in the upper end of the shank. The lower member of the toggle joint levers is preferably formed of two separate parts 14', 14', which are connected together by the bolt or rivet 15 when said levers are pivotally connected with the upper member 10 by the pivotal bolt or rivet 16. The flange 14 serves the two-fold purpose of a strengthening flange between the walls of the recesses 13 and as the contact bearing for the opposing ends of the trunnions 12. The upper member 10 is pivotally supported from the beam by the transversely arranged bolt 5 which bolt also performs the additional function of securing the bracket 17 to the respective draw bars 2 of the beam. The upper member 10 of the toggle joint levers is provided at its upper end with two parallel lugs 18 which are pivotally connected with the spring supporting rod 19 by the pivotal bolt 20. The bracket 17 is provided with a transverse bearing 21 which extends around and beneath the draw bars 2 and which, as said bracket is pressed rearwardly by the recoil of the spiral spring 22 coöperates with the bolt 5 to hold said bracket in place. It will be understood that the upper end of said bracket 17 forms a contact bearing 23 for the spiral spring 22, while said spring is retained in place with greater or less tension against said bracket by the adjusting nut 24 which has screw threaded bearings on the lower end of the spring supporting rod 19. Thus it will be understood that when desirous to increase the resistance of the tooth, the nut 24 is turned rearwardly or against the spiral spring, whereby the tension of the spring is increased and the tooth will resist greater pressure before it will be thrown out of working position. When, however it is desirous to diminish the resistance to the rearward movement of the tooth, said nut 24 is turned forwardly or in the opposite direction away from the spring. Thus the tension of the spring and the resistance of the tooth may be increased or diminished as circumstances may require. The front end of the spring supporting rod 19 is slidably supported from the draw bars 2 by the bracket 25, which bracket is interposed between the draw bars 2 and rigidly secured in place by the transversely arranged bolt 3. It will be understood that the aperture in said bracket 25 in which the lower end of the rod 19 is supported is made sufficiently large to permit of the required change of inclination of said rod by the movement of the toggle joint levers. While I preferably provide the upper end of the spring supporting rod 19 with a U-shaped hook 26 as shown in Fig. 1, which hook is connected with the lugs 18 of the toggle joint levers by a transversely aranged pin 20, the upper end of said rod 19, may, if desired, be connected with a block 27, by a screw threaded joint 28 and said block supported between the lugs 18 by a transversely arranged pin as indicated in Fig. 3.

29 is an ordinary connecting bar by which the respective draw bars of the beam are connected with the cultivator. The bar 29 is connected with the respective bars 2 of the beam by the two-arm bracket 30. The upper end of said bracket 30 is connected with the bar 29 by bolts or rivets 31, while the lower arms of said bracket 30 are adapted to straddle the spiral spring 22 and spring supporting rod and are pivotally connected with two opposing inner sides of the draw bars 2 by the bolt 4. The arms of said bracket 30 are of such length as to permit of the free upward and downward movement of the spring and spring supporting rod without contacting with said bracket. The upper ends of the bars 14' are respectively provided with opposing inwardly projecting sleeves 32 which engage and which have bearings in the aperture 33 of the lever 10, and said sleeves are retained in place in said aperture by the bolts or rivets 15 and 16. The function of the sleeves 32 is to form a joint between the respective members of said toggle joint levers and to relieve the bolt or rivet 16 from the strain that it would otherwise be subjected to.

It will be obvious that by the arrangement of the coöperating parts shown in Fig. 1, the resistance of the spring 22 to the movement of the toggle joint levers is least when such levers and spring supporting rod 19 approach the horizontal position shown in Fig. 1 and that the power of the spring over such levers is greatest as the upper member of the levers approaches the vertical at right angles to the beam, also that when the tooth has been thrown back by contact with an obstruction and the upper end of the lever is brought to the position indicated in dotted lines in Fig. 1, the power of the spring over such levers will be greatest, whereby the cultivator tool will as previously stated be quickly drawn back to its normal position when released from contact with the obstruction.

To prevent the draw bars 2, 2, from impinging against the sides of the upper member 10 of the toggle joint lever, I preferably provide such upper member with a pivotal sleeve 35, the ends of which protrude slightly past the sides of such members and contact with the respective draw bars, whereby when said draw bars are drawn firmly together by the pivotal bolt 5 they bear against the ends of said sleeve without interfering with the rocking movement of the member 10 thereon. It will be understood that said sleeve 35 is provided with a longitudinal hole through its center for the reception of said bolt 5. Attention is also called to the fact that the transverse bearing 21 of the bracket 17 not only coöperates with the bolt 5 to hold said bracket in place, but it also performs an important function as a stop to the forward movement of the upper member 10 of the toggle joint levers, whereby as the cultivator tooth is thrown rearwardly by contact with an obstruction the forward movement of said member will be checked by contact with said transverse bearing 21.

Having thus described my invention what I claim as new and desire to secure by Letters Patent is,

1. The combination of a cultivator beam, a tooth supporting shank, and means for pivotally supporting said shank from said beam, of a pair of toggle joint levers, an actuating spring and a spring supporting rod, said spring and rod being located in front of and substantially in line with said levers, a spring supporting bracket located at the junction of said levers and rod, a rod supporting bracket located at the front end of said rod, the rear member of said toggle joint levers being pivotally connected with the upper ends of said shank, the front member being pivotally connected with said beam, said spring supporting rod being connected at its rear end to the front member of said toggle joint levers above the beam and extending forwardly from said levers and slidably connected at its front end with said rod supporting bracket, an adjustable nut located on said rod, adapted to regulate the tension of said spring, a stop connected with said beam adapted to limit the forward movement of the lower end of said toggle joint levers and the rearward movement of the lower end of said shank, said shank, levers, spring, spring supporting rod and brackets being adapted by their relative arrangement described to cause said spring to act with its greatest power when the shank has reached the extreme limit of its rearward movement, while it prevents said shank from moving to a point past the action of said spring.

2. In a device of the described class the combination of a beam, a tooth supporting shank, a pair of toggle joint levers, means for yieldingly retaining said toggle joint levers and shank in their normal position for use, the upper end of said shank being provided with two parallel series of recesses for temporary engagement with said toggle joint levers, and with a longitudinal strengthening flange centrally located between the recesses of said series.

3. In a device of the described class the combination of a beam, a tooth supporting shank, a pair of toggle joint levers, a spring adapted to yieldingly hold said levers and shank in their normal position for use, a spring supporting rod, a bracket and a bracket retaining bolt affixed to said beam at the junction of said rod with said toggle joint levers, the upper sides of said bracket being adapted to serve as a bearing for said spring, while the lower side serves as a stop to limit the forward movement of the upper member of said toggle joint levers and the forward movement of the lower end of said shank, substantially as specified.

In testimony whereof I affix my signature in the presence of two witnesses.

CHARLES J. KALKHURST.

Witnesses:
JAS. B. ERWIN,
O. R. ERWIN.